(No Model.)
O. G. SEWARD, O. E. MILLE & M. J. HAM.
AUTOMATIC GAS GENERATOR.
No. 560,549. Patented May 19, 1896.
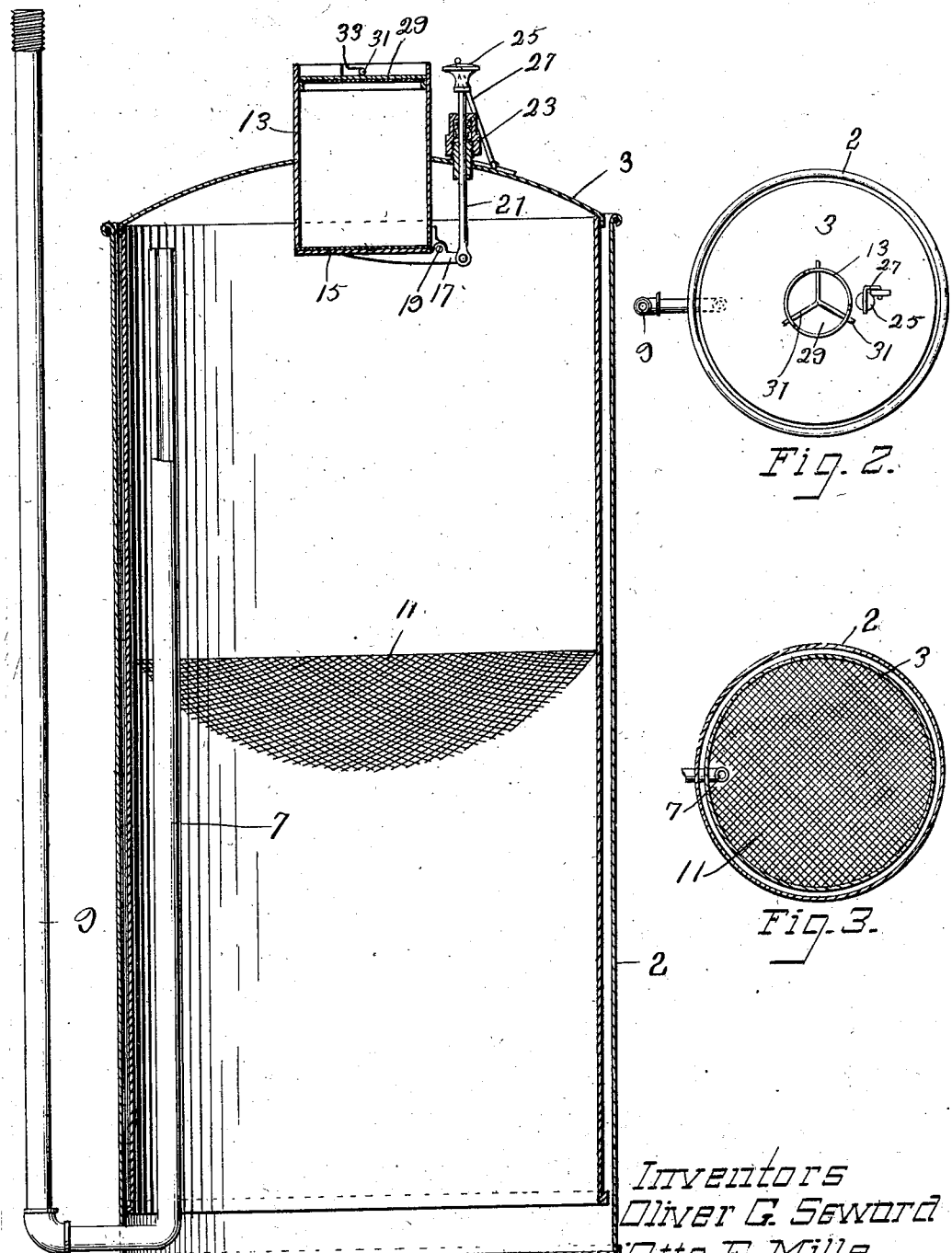
Witnesses
B. P. Shepherd
W. E. Gooley
Inventors
Oliver G. Seward
Otto E. Mille
Miron J. Ham
By Paul & Hawley
their attorneys

UNITED STATES PATENT OFFICE.

OLIVER G. SEWARD, OTTO E. MILLE, AND MIRON J. HAM, OF MINNEAPOLIS, MINNESOTA.

AUTOMATIC GAS-GENERATOR.

SPECIFICATION forming part of Letters Patent No. 560,549, dated May 19, 1896.

Application filed March 17, 1896. Serial No. 583,627. (No model.)

*To all whom it may concern:*

Be it known that we, OLIVER G. SEWARD, OTTO E. MILLE, and MIRON J. HAM, of Minneapolis, county of Hennepin, State of Minnesota, have invented certain new and useful Improvements in Automatic Gas-Generators, of which the following is a specification.

The objects of this invention are to provide, first, an automatic generator for the production of acetylene or other gas; second, to provide means for supplying to such apparatus while in use calcium carbide or other gas-generating material.

To these ends our invention consists generally in the constructions and combinations, as hereinafter described, and particularly pointed out in the claims.

In the accompanying drawings, forming part of this specification, Figure 1 is a transverse vertical section of our apparatus. Fig. 2 is a plan view on a smaller scale. Fig. 3 is a horizontal section taken above the plane of the perforated shelf, also on a smaller scale than that of Fig. 1.

In the drawings, 2 represents a suitable tank or receptacle open at its upper end and formed of any suitable material and of any suitable size or construction.

3 represents an inverted receptacle or holder closed at its upper end and open at its lower end and arranged within the tank or receptacle 2. These two parts may be constructed in the form of an ordinary gas-holder. A pipe 7 has its open end arranged within the holder 3 at a point near the top of the receptacle 2, and extends down through the open end of the holder 3 and out through the receptacle 2 and is connected to a service-pipe 9. The holder 3 is provided with a perforated shelf 11, secured at some convenient point therein and extending across said holder. This shelf, as here shown, is formed of wire-netting and is of curved form; but it may be of any preferred or suitable shape and formed of any suitable perforated material. The shelf is provided with an opening through which the pipe 7 extends, as shown in Fig. 1. We may arrange this shelf at any convenient point within the holder 3.

The top of the holder is provided with a feed-receptacle 13, open at the top and bottom and provided at its bottom with a trap-door 15, arranged to make an air-tight joint to said receptacle. Said door is provided with an arm 17, extending beyond the hinge 19, and said arm is connected to a rod 21, that extends through a suitable stuffing-box 23 and is provided at its end with a suitable knob or handle 25. A pivoted link 27 is arranged upon the top of the holder 3, and is adapted to be swung over the top of the rod 21 for the purpose of locking the door 15 in its closed position. The top of the receptacle 13 is also provided with a cover 29, that preferably forms an air-tight closure for said receptacle. As here shown, the top of the cover is provided with the three arms 31, that are adapted to be locked into the bayonet-joint slots 33, upon the top of the receptacle 13. We do not confine ourselves, however, to any particular means for securing this cover in position nor to any particular means for operating the trap-door 15, as the construction employed for these purposes may obviously be very materially altered without departing from our invention.

The operation of the device is as follows: The receptacle 2 is filled with water to a desired height, which must be sufficient to immerse the perforated shelf 11. Calcium carbide, or other material from which gas is generated, upon immersion of the material in water, is placed in the receptacle 13, the cover 29 being removed from said receptacle, and the trap-door 15 being closed, and the cover 29 is then replaced and firmly locked in position. The trap-door 15 is then opened and the material in the receptacle 13 falls down onto the perforated shelf 11. Gas is then generated, which rises into the space within the holder 3 above the water in the tank, and raises said holder and brings the shelf 11 and the material supported thereon above the level of the water in the tank. When the shelf 11 and the material carried thereby is raised above the surface of the water, the generation of gas ceases, the gas in the holder is forced out through the pipe 7 to the service-pipe 9, and as the gas is used the holder moves down until the perforated shelf 11 and the material carried thereby is again immersed in water, when the operation is repeated. This goes on until the material is used up. Additional material may, however, be supplied at any time through the means already described. As a substitute for the perforated shelf 11 a non-perforated shelf might be used which did not extend entirely across the receptacle, and the material being thrown upon this shelf the water would reach it by passing up by the shelf and flowing over the top thereof. We prefer, however, to use a perforated shelf which permits the water to pass through it and to reach all parts of the material supported upon said shelf.

Having thus described our invention, we claim as new and desire to secure by Letters Patent—

1. The combination of the liquid-holding tank, the rising-and-falling gas-holder, closed at its top and open at its bottom, located in said liquid-tank and provided with a diaphragm for supporting a gas-generating material, the feed-receptacle opening into and carried by the gas-holder in its up-and-down movement, and provided with a top cover, a hinged bottom to the feed-receptacle, an operating device passed through the gas-holder and connected to said hinged bottom for lifting the hinged bottom to close the same against the bottom of the feed-receptacle, means for locking said device to hold the hinged bottom against the bottom of the feed-receptacle, and a gas-exit pipe opening into the upper part of the gas-holder, substantially as and for the purposes described.

2. The combination of the liquid-holding tank, the rising-and-falling gas-holder, closed at its top and open at its bottom, located in said liquid-tank and provided with a diaphragm for supporting a gas-generating material, the feed-receptacle opening through and carried by the gas-holder in its up-and-down movement and provided with a top cover, the hinged bottom to the feed-receptacle, the operating-rod 21 connected to the hinged bottom and extending through the gas-holder, and the link 27 for locking said rod and holding the hinged bottom against the bottom of the feed-receptacle, and a gas-exit pipe opening into the upper part of the gas-holder substantially as and for the purposes described.

In testimony whereof we have hereunto set our hands this 21st day of February, A.D. 1896.

OLIVER G. SEWARD.
  OTTO E. MILLE.
  MIRON J. HAM.

In presence of—
 A. C. PAUL,
 M. E. GOOLEY.